(12) United States Patent
Davis

(10) Patent No.: US 11,365,755 B1
(45) Date of Patent: Jun. 21, 2022

(54) STREET PADDLE ASSEMBLY

(71) Applicant: Donald Davis, Dallas, TX (US)

(72) Inventor: Donald Davis, Dallas, TX (US)

( * ) Notice: Subject to any disclaimer, the term of this patent is extended or adjusted under 35 U.S.C. 154(b) by 0 days.

(21) Appl. No.: 17/154,076

(22) Filed: Jan. 21, 2021

(51) Int. Cl.
*A63C 17/00* (2006.01)
*F16B 7/10* (2006.01)

(52) U.S. Cl.
CPC .......... *F16B 7/105* (2013.01); *A63C 17/0013* (2013.01)

(58) Field of Classification Search
CPC ... A63C 17/0013; A63C 17/22; A63C 17/221; A45B 2009/005; A45B 2009/007; A45B 9/02
USPC ........................................................ 280/826
See application file for complete search history.

(56) References Cited

U.S. PATENT DOCUMENTS

| | | | | |
|---|---|---|---|---|
| D262,646 S | * | 1/1982 | Mace ............................ | D21/775 |
| 5,163,710 A | * | 11/1992 | Chirtel .................... | A63C 11/22 135/78 |
| 5,236,222 A | * | 8/1993 | Fletcher .............. | A63C 17/0013 135/77 |
| 5,312,135 A | * | 5/1994 | Karabees ................. | A63C 3/00 135/85 |
| 5,388,673 A | * | 2/1995 | Rohner, III ........ | A63C 17/0013 188/5 |
| 5,653,468 A | * | 8/1997 | Ostapyk .................... | A45B 1/02 135/66 |
| 5,687,991 A | * | 11/1997 | Gairdner .................. | A63C 3/00 135/85 |
| 5,722,445 A | * | 3/1998 | Hae .......................... | A45B 3/00 135/65 |
| 5,766,708 A | * | 6/1998 | Panizza .................. | A63C 11/22 280/819 |
| D397,393 S | * | 8/1998 | Reed ........................... | D21/775 |
| 5,938,240 A | * | 8/1999 | Gairdner ............ | A63C 17/0013 280/826 |
| 6,142,526 A | * | 11/2000 | Katz ...................... | A63C 11/22 135/75 |
| 7,712,478 B2 | * | 5/2010 | Gibbons .................. | A61H 3/02 135/73 |
| 7,992,258 B1 | * | 8/2011 | Stitser ...................... | A45B 3/04 16/430 |
| 8,636,305 B2 | * | 1/2014 | Gonzalez ........... | A63C 17/0013 280/809 |
| 8,636,306 B2 | * | 1/2014 | McBride ............ | A63C 17/0013 280/821 |

(Continued)

FOREIGN PATENT DOCUMENTS

WO    WO2006065979    6/2006

*Primary Examiner* — Jeffrey J Restifo

(57) ABSTRACT

A street paddle assembly for propelling, balancing, and slowing the user upon a skateboard includes a shaft, a tube, and a foot. The shaft comprises a plurality of sections, which are selectively mutually engageable so that the sections are linearly oriented. A connector engaged to each of the plurality of sections is positioned to retain the sections in proximity when the sections are mutually disengaged. The foot is engaged to a lower end of the shaft and can frictionally engage a surface. The tube is selectively engageable to an upper end of the shaft and extends bidirectionally therefrom. The tube and the shaft can be grasped in a respective hands of a user, positioning the user to utilize the assembly. Each of a pair of caps selectively engageable to a respective opposed endpoint of the tube retain an article positioned in the tube.

12 Claims, 4 Drawing Sheets

(56) References Cited

U.S. PATENT DOCUMENTS

| | | | |
|---|---|---|---|
| 8,950,415 B1* | 2/2015 | Spletzer | A61H 3/02 135/74 |
| 9,226,555 B1* | 1/2016 | Shyu | A45B 3/04 |
| 9,724,593 B2* | 8/2017 | Sandusky | A63C 17/26 |
| 10,004,306 B1* | 6/2018 | Randel, Jr. | A45B 9/02 |
| 2006/0273570 A1 | 12/2006 | Silverman | |
| 2009/0236816 A1* | 9/2009 | McBride | A63C 17/0013 280/219 |
| 2010/0006128 A1* | 1/2010 | Lamoureux | A61H 3/00 135/65 |
| 2010/0254751 A1* | 10/2010 | McMillan, III | A45B 9/02 403/109.1 |
| 2011/0101664 A1* | 5/2011 | Gonzalez | A63C 17/0013 280/821 |
| 2011/0175338 A1* | 7/2011 | Senseman | A63C 17/0013 280/821 |
| 2011/0271990 A1* | 11/2011 | Diamond | B25G 1/102 135/65 |
| 2012/0049502 A1* | 3/2012 | Ascunce | A63C 17/0013 280/821 |
| 2012/0139224 A1* | 6/2012 | Weir | A63C 17/0013 280/821 |
| 2012/0326425 A1* | 12/2012 | Cubillo | A63C 17/0013 280/819 |
| 2013/0312797 A1* | 11/2013 | Lah | A45B 19/08 135/74 |
| 2014/0069475 A1* | 3/2014 | Lenhart | A45B 9/02 135/74 |
| 2015/0140890 A1* | 5/2015 | Perlmutter | A63C 17/0013 446/22 |
| 2018/0257486 A1* | 9/2018 | Noble Nava | B60B 19/12 |
| 2018/0296905 A1* | 10/2018 | Brennan | A63C 17/0013 |
| 2020/0170860 A1* | 6/2020 | Kong | A61G 7/1019 |
| 2020/0179776 A1* | 6/2020 | Roiser | A45B 9/00 |
| 2021/0085042 A1* | 3/2021 | Hu | A63B 29/08 |
| 2021/0106104 A1* | 4/2021 | Shute | A45B 9/04 |

\* cited by examiner

STREET PADDLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to paddle assemblies and more particularly pertains to a new paddle assembly for propelling, balancing, and slowing the user upon a skateboard. The present invention discloses a paddle assembly comprising a plurality of tubular sections, which are tethered together by an internal elastic band, and having a removable handle that can function as a storage compartment

(2) Description of Related Art Including Information Disclosed Under 37 CFR 1.97 and 1.98

The prior art relates to paddle assemblies, which may include poles comprising a plurality of sections for use in skating, roller boarding, snowboarding, spikeboarding, and the like. These poles may have a foot engaged to one end and a handle to the other end. The foot may be configured to frictionally engage a surface. What is lacking in the prior art is a paddle assembly comprising a plurality of tubular sections, which are tethered together by an internal elastic band. Prior art paddle assemblies also lack a removable handle that can function as a storage compartment.

BRIEF SUMMARY OF THE INVENTION

An embodiment of the disclosure meets the needs presented above by generally comprising a shaft, a tube, and a foot. The shaft comprises a plurality of sections, which are selectively mutually engageable so that the sections are linearly oriented. A connector engaged to each of the plurality of sections is positioned to retain the sections in proximity when the sections are mutually disengaged. The foot is engaged to a lower end of the shaft and is configured to frictionally engage a surface. The tube is selectively engageable to an upper end of the shaft and extends bidirectionally therefrom. The tube and the shaft are configured to be grasped in a respective hands of a user so that the user is positioned to utilize the shaft to propel, balance, and slow the user upon a skateboard. Each of a pair of caps selectively engageable to a respective opposed endpoint of the tube are configured to retain an article positioned in the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
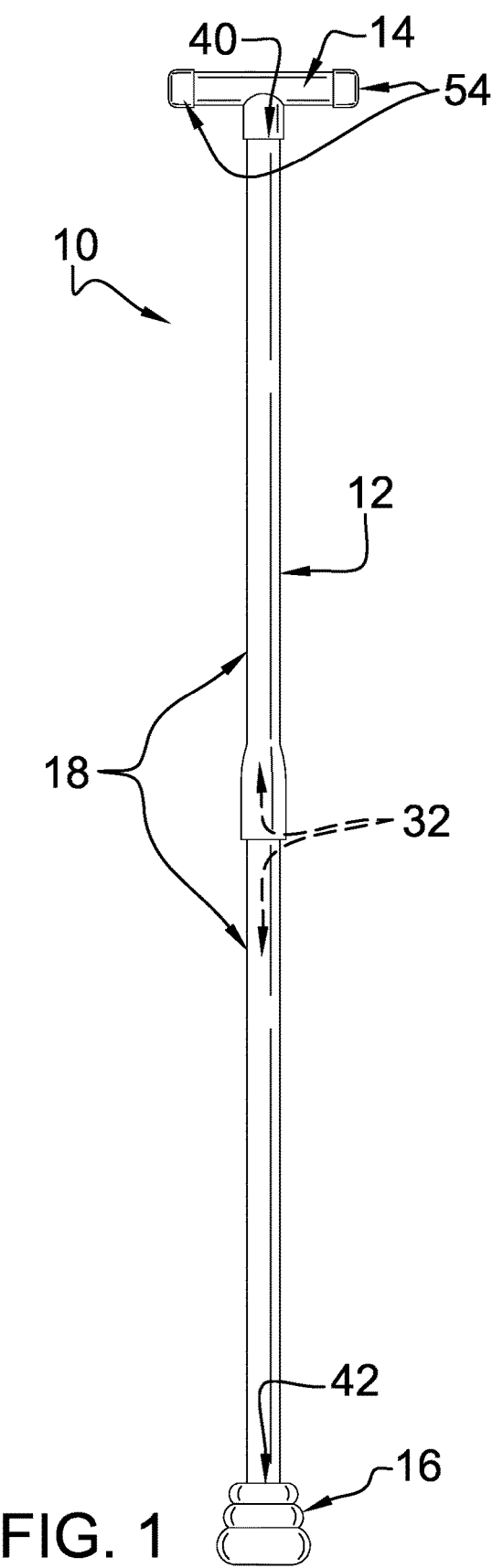
FIG. 1 is a front view of a street paddle assembly according to an embodiment of the disclosure.

With reference now to the drawings, and in particular to FIGS. 1 through 5 thereof, a new paddle assembly embodying the principles and concepts of an embodiment of the disclosure and generally designated by the reference numeral 10 will be described.

As best illustrated in FIGS. 1 through 5, the street paddle assembly 10 generally comprises a shaft 12, a tube 14, and a foot 16. The shaft 12 comprises a plurality of sections 18, which are selectively mutually engageable so that the sections 18 are linearly oriented. The shaft 12 is resiliently flexible so that the shaft 12 is bendable. The shaft 12 may comprise polyvinyl chloride or other resiliently bendable material, such as, but not limited to, polyethylene, fiberglass, and the like. As will become apparent, the shaft 12 being resiliently flexible and bendable aids in providing thrust during utilization of the assembly 10 by a skateboarder.

Figure 2:
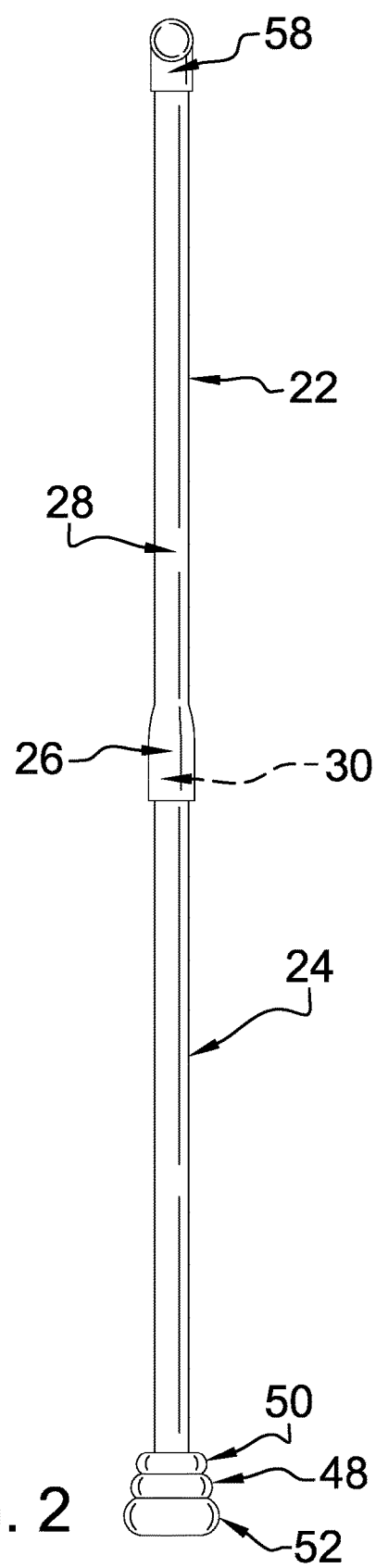
FIG. 2 is a side view of an embodiment of the disclosure.

The shaft 12 is tubular and has a cross-sectional profile 20, which may be substantially circular, as shown in FIG. 2. The present invention also anticipates the cross-sectional profile 20 being oval, elliptical, and the like.

Figure 3:
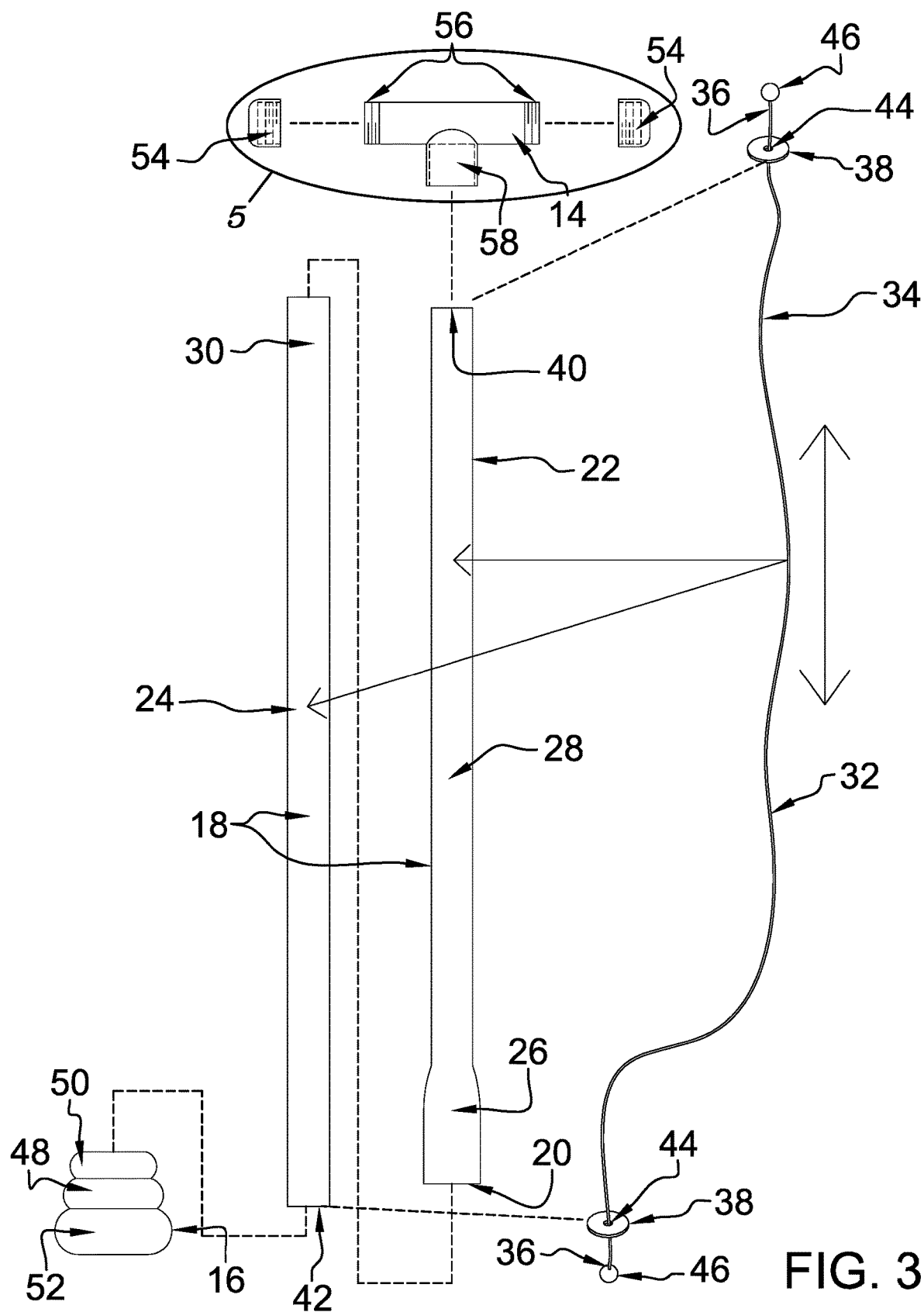
FIG. 3 is an exploded view of an embodiment of the disclosure.
Figure 4:
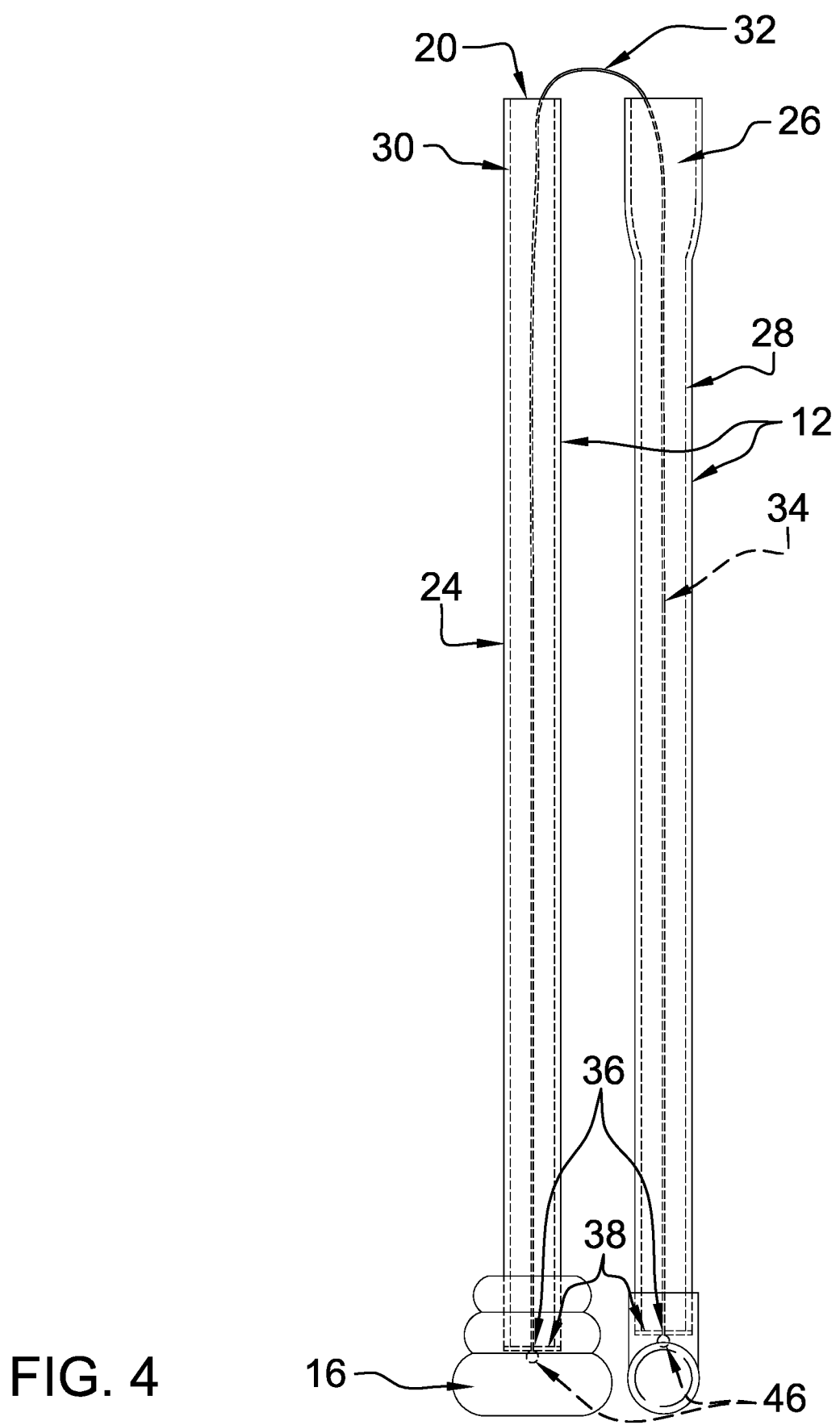
FIG. 4 is a side view of an embodiment of the disclosure.
Figure 5:
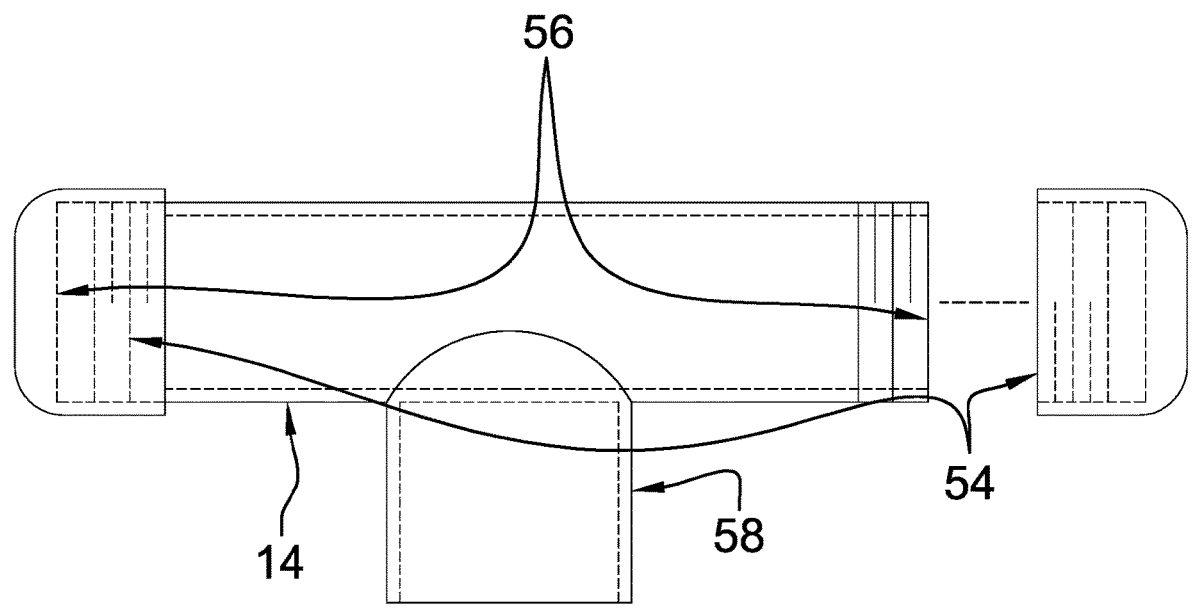
FIG. 5 is a detail view of an embodiment of the disclosure.

The plurality of sections 18 comprises an upper segment 22 and a lower segment 24. A lower portion 26 of the upper segment 22 is circumferentially larger than an upper portion 28 thereof so that the lower portion 26 is complementary to the lower segment 24. A part 30 of the lower segment 24 is positioned for selective insertion into the lower portion 26 of the upper segment 22 to removably engage the lower segment 24 to the upper segment 22, as shown in FIG. 3. The present invention also anticipates the lower segment 24 being removably engageable to the upper segment 22 via other means, such as, but not limited to, threaded engagement, compression fittings, and the like.

A connector 32 engaged to each of the plurality of sections 18 is positioned to retain the sections 18 in proximity to each other when the sections 18 are mutually disengaged. The connector 32 may comprise a line 34 positioned in the shaft 12 and having opposed ends 36 engaged singly to the upper segment 22 and the lower segment 24. The line 34 is resiliently flexible and thus is configured to be stretched so that the upper segment 22 and the lower segment 24 are separable and selectively positionable in a nonlinear configuration, as shown in FIG. 3. The line 34 comprises elastic. The present invention anticipates the connector 32 comprising other connecting means, such as, but not limited to, hinges, paired magnets, and the like.

The assembly 10 also may comprise a pair of discs 38, which are circumferentially larger than the upper segment 22 and the lower segment 24. The discs 38 are positioned externally to the shaft 12 and singly adjacent an upper end 40 and a lower end 42 thereof. The line 34 is engaged to and extends between the discs 38 so that the line 34 is under tension when the lower segment 24 is engaged to the upper segment 22. Each disc 38 also may have a hole 44 positioned axially therethrough, with the line 34 extending through the holes 44. Each of a pair of knobs 46 is engaged to respective opposed end 36 of the line 34 so that the knobs 46 are positioned to engage the line 34 to the pair of discs 38.

The foot 16 is engaged to the lower end 42 of the shaft 12 and is configured to frictionally engage a surface, such as a street surface, sidewalk surface, and the like. The foot 16 comprises rubber, silicone, or elastomer. The foot 16 comprises a medial element 48, which is engaged to an upper element 50 and a lower element 52. The medial element 48, the upper element 50, the lower element 52 are toroidal so that the shaft 12 is selectively insertable thereinto to removably engage the foot 16 to the shaft 12, as shown in FIG. 3. The upper element 50 is circumferentially smaller than the medial element 48. The medial element 48 is circumferentially smaller than the lower element 52.

The tube 14 is selectively engageable to the upper end 40 of the shaft 12 and extends bidirectionally therefrom, as shown in FIG. 3. The tube 14 and the shaft 12 are configured to be grasped in a respective hands of a user so that the user is positioned to utilize the shaft 12 to propel, balance, and slow the user upon a skateboard.

Each of a pair of caps 54 selectively engageable to a respective opposed endpoint 56 of the tube 14 is configured to retain an article, such as cash, positioned in the tube 14. The caps 56 are threadedly engageable to the tube 14, as shown in FIG. 3.

A pipe 58 is engaged to the tube 14 and extends therefrom substantially equally distant from the opposed endpoints 56. The pipe 58 is circumferentially complementary to the upper end 40 of the shaft 12 and thus is positioned for selective insertion of the upper end 40 to removably engage the tube 14 to the shaft 12.

In use, tube 14 and the shaft 12 are grasped in the hands of a user positioned upon a skateboard. The user can position the foot 16 upon the surface and exert force upon the shaft 12 to propel, balance, and slow the user and the skateboard. When not in use, the upper segment 22 and lower segment 24 can be disengaged to render the assembly 10 more compact and suitable for transport, for example in a trunk of a vehicle, or aboard a train or a bus.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A street paddle assembly comprising:
    a shaft comprising a plurality of sections, the sections being selectively mutually engageable such that the sections are linearly oriented, wherein the shaft is tubular, the plurality of sections comprising an upper segment and a lower segment, a lower portion of the upper segment being circumferentially larger than an upper portion thereof, such that the lower portion is complementary to the lower segment, such that a part of the lower segment is positioned for selective insertion into the lower portion of the upper segment for removably engaging the lower segment to the upper segment;
    a connector engaged to each of the plurality of sections, such that the connector is positioned for retaining the sections in proximity when the sections are mutually disengaged, wherein the connector comprises a line positioned in the shaft, the line having opposed ends engaged singly to the upper segment and the lower segment, the line being resiliently flexible, wherein the line is configured for stretching, such that the upper segment and the lower segment are separable and selectively positionable in a nonlinear configuration;
    a foot engaged to a lower end of the shaft and being configured for frictionally engaging a surface;
    a tube selectively engageable to an upper end of the shaft, such that the tube extends bidirectionally therefrom, wherein the tube and the shaft are configured for grasping in respective hands of a user, such that the user is positioned for utilizing the shaft for propelling, balancing, and slowing the user upon a skateboard;
    a pair of caps, each cap being selectively engageable to a respective opposed endpoint of the tube, wherein the caps are configured for retaining an article positioned in the tube; and
    a pair of discs, the discs being circumferentially larger than the upper segment and the lower segment, the discs being positioned externally to the shaft and singly adjacent the upper end and the lower end, the line being engaged to and extending between the discs, such that the line is under tension when the lower segment is engaged to the upper segment.

2. The street paddle assembly of claim 1, wherein the shaft is resiliently flexible, such that the shaft is bendable.

3. The street paddle assembly of claim 2, wherein the shaft comprising polyvinyl chloride.

4. The street paddle assembly of claim 1, wherein the shaft has a cross-sectional profile, the cross-sectional profile being substantially circular.

5. The street paddle assembly of claim 1, wherein the line comprises elastic.

6. The street paddle assembly of claim 1, further including:
   each disc having a hole positioned axially therethrough, the line extending through the holes; and
   a pair of knobs, each knob being engaged to respective opposed end of the line, such that the knobs are positioned for engaging the line to the pair of discs.

7. The street paddle assembly of claim 1, wherein the foot comprises rubber.

8. The street paddle assembly of claim 7, wherein:
   the foot comprises a medial element engaged to an upper element and a lower element; and
   the medial element, the upper element, the lower element being toroidal, such that the shaft is selectively insertable thereinto.

9. The street paddle assembly of claim 8, wherein:
   the upper element is circumferentially smaller than the medial element; and
   the medial element is circumferentially smaller than the lower element.

10. The street paddle assembly of claim 1, wherein the caps are threadedly engageable to the tube.

11. The street paddle assembly of claim 1, further including a pipe engaged to the tube and extending therefrom substantially equally distant from the opposed endpoints, the pipe being circumferentially complementary to the upper end of the shaft, such that the pipe is positioned for selective insertion of the upper end for removably engaging the tube to the shaft.

12. A street paddle assembly comprising:
   a shaft comprising a plurality of sections, the sections being selectively mutually engageable such that the sections are linearly oriented, the shaft being resiliently flexible, such that the shaft is bendable, the shaft comprising polyvinyl chloride, the shaft being tubular, the shaft having a cross-sectional profile, the cross-sectional profile being substantially circular, the plurality of sections comprising an upper segment and a lower segment, a lower portion of the upper segment being circumferentially larger than an upper portion thereof, such that the lower portion is complementary to the lower segment, such that a part of the lower segment is positioned for selective insertion into the lower portion of the upper segment for removably engaging the lower segment to the upper segment;
   a connector engaged to each of the plurality of sections, such that the connector is positioned for retaining the sections in proximity when the sections are mutually disengaged, the connector comprising:
      a line positioned in the shaft, the line being resiliently flexible, the line comprising elastic,
      a pair of discs, the discs being circumferentially larger than the upper segment and the lower segment, the discs being positioned externally to the shaft and singly adjacent an upper end and a lower end thereof, each disc having a hole positioned axially therethrough, the line extending through the holes, and
      a pair of knobs, each knob being engaged to respective opposed end of the line, such that the knobs are positioned for engaging the line to the pair of discs, such that the line is engaged to and extends between the discs, such that the line is under tension when the lower segment is engaged to the upper segment, wherein the line is configured for stretching, such that the upper segment and the lower segment are separable and selectively positionable in a nonlinear configuration;
   a foot engaged to the lower end of the shaft and being configured for frictionally engaging a surface, the footing comprising rubber, the foot comprising a medial element engaged to an upper element and a lower element, the medial element, the upper element, the lower element being toroidal, such that the shaft is selectively insertable thereinto, the upper element being circumferentially smaller than the medial element, the medial element being circumferentially smaller than the lower element;
   a tube selectively engageable to the upper end of the shaft, such that the tube extends bidirectionally therefrom, wherein the tube and the shaft are configured for grasping in respective hands of a user, such that the user is positioned for utilizing the shaft for propelling, balancing, and slowing the user upon a skateboard;
   a pair of caps, each cap being selectively threadedly engageable to a respective opposed endpoint of the tube, wherein the caps are configured for retaining an article positioned in the tube; and
   a pipe engaged to the tube and extending therefrom substantially equally distant from the opposed endpoints, the pipe being circumferentially complementary to the upper end of the shaft, such that the pipe is positioned for selective insertion of the upper end for removably engaging the tube to the shaft.

* * * * *